(12) United States Patent
Noiret

(10) Patent No.: US 8,392,042 B2
(45) Date of Patent: Mar. 5, 2013

(54) METHOD FOR DRIVING A HYBRID TRACTION CHAIN BASED ON THE BATTERY CHARGE STATE

(75) Inventor: Christian Noiret, Le Pecq (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 399 days.

(21) Appl. No.: 12/681,618

(22) PCT Filed: Sep. 30, 2008

(86) PCT No.: PCT/FR2008/051752
§ 371 (c)(1),
(2), (4) Date: Apr. 2, 2010

(87) PCT Pub. No.: WO2009/050406
PCT Pub. Date: Apr. 23, 2009

(65) Prior Publication Data
US 2010/0280694 A1    Nov. 4, 2010

(30) Foreign Application Priority Data
Oct. 3, 2007 (FR) .................................. 07 58040

(51) Int. Cl.
*G06F 17/00* (2006.01)
(52) U.S. Cl. .......................................... 701/22; 322/16
(58) Field of Classification Search .................... 701/22; 180/65.29, 65.285, 65.21, 65.265, 65.28, 180/65.25, 65.6, 65.245, 65.27, 65.23, 65.225, 180/165; 477/3; 903/915, 905, 903, 947, 903/945; 320/132, 104; 475/5; 318/153, 318/140; 322/16
See application file for complete search history.

(56) References Cited

U.S. PATENT DOCUMENTS

| | | | |
|---|---|---|---|
| 5,550,445 A | 8/1996 | Nii | |
| 5,839,533 A | 11/1998 | Mikami et al. | |
| 5,929,595 A | 7/1999 | Lyons et al. | |
| 7,108,088 B2* | 9/2006 | Muta | 180/65.235 |
| 7,173,396 B2 | 2/2007 | Gunji et al. | |
| 7,347,175 B2* | 3/2008 | Lupo et al. | 123/179.4 |
| 7,830,117 B2* | 11/2010 | Ambrosio et al. | 320/109 |
| 2006/0076171 A1 | 4/2006 | Donnelly et al. | |
| 2006/0116797 A1 | 6/2006 | Moran | |

FOREIGN PATENT DOCUMENTS

| | | |
|---|---|---|
| EP | 0611675 A | 8/1994 |
| EP | 0917982 A | 5/1999 |

OTHER PUBLICATIONS

International Search Report of PCT Appl. No. PCT/FR2008/051752 mailed Jul. 24, 2009.

\* cited by examiner

*Primary Examiner* — Thomas Black
*Assistant Examiner* — Marthe Marc-Coleman
(74) *Attorney, Agent, or Firm* — Nicolas E. Seckel

(57) ABSTRACT

The control method for a hybrid drive system of a vehicle includes (1) acquiring the driver's acceleration desire for determining the power for the corresponding wheel (Pwheel), the charge level of the battery (SOC) between a minimum (SOCmin) and a maximum (SOCmax) thresholds for a predetermined traction mode, and the available braking power (Pfrein) for deciding between electric or dissipative braking; (2) managing the charge (SOC) for, based on a first (SOC1 bmin) and a second (SOC2 bmin) minimum thresholds of the charge (SOC) and the driver's requested wheel power (Pwheel), either imposing a battery recharge or setting input parameters for the traction mode selection; and (3) selecting the traction mode, based on the battery power actually available (Pbat), the driver's requested wheel power (Pwheel), and the maximum power available at the thermal engine output (Pmthmax), for selecting the traction mode most adapted to the actual situation of the vehicle.

11 Claims, 6 Drawing Sheets

METHOD FOR DRIVING A HYBRID TRACTION CHAIN BASED ON THE BATTERY CHARGE STATE

BACKGROUND ART

The present invention relates to a method for controlling a hybrid drive system based solely on managing the level of charge of the battery. A hybrid drive system of a vehicle, in particular of a motor vehicle, is generally defined as a set of members that equip the hybrid vehicle, comprising in particular:

- a heat engine intended to supply the main drive energy;
- an electric machine (ELM) coupled to the drive wheels of the vehicle using a fixed or variable gear reduction ratio and adapted to operate in motor or generator mode: in motor mode, the machine supplies electric energy to the drive wheels, and in generator mode, the electric machine transforms the mechanical energy supplied by the heat engine and/or the wheels (regenerative braking) into electrical energy stored in a battery; "battery" is more generally defined as a system for storing electrical energy, which can take the form of one or more accumulator-based elements and/or super capacitors, also known as super condensers, used alone or in combination;
- an electric machine that makes it possible to start the heat engine, e.g., in a "Stop-and-Go" operating mode;
- an active regenerative braking system, i.e., controlled by the brake pedal, for example, or a passive one, i.e., controlled by the beginning of the accelerator movement, for example.

The need to reduce global warming by reducing $CO_2$ emissions has accelerated the development of hybrid drive systems.

In order to optimize the efficiency of such a drive system comprising multiple members, one must have a control system to supervise the energy sources used in the drive system by controlling the various members of the drive system each in turn or at the same time.

Of the various possible operating modes of a hybrid drive system, we will distinguish primarily the following:
- pure electric drive;
- pure combustion drive,
- combined combustion and electric drive (boost function);
- combustion drive and battery recharge;
- pure electric braking;
- pure dissipative braking;
- electric and dissipative braking Various strategies exist for controlling a hybrid vehicle, which are generally based on heat engine and electric motor outputs, as well as the outputs of the battery and the associated power electronics. From document US-B2-7173396, a control process is also known that uses battery control in a hybrid drive system, which determines battery discharge and recharge according to the various operating conditions of the hybrid vehicle.

SUMMARY OF THE INVENTION

Based on the principle that the electric drive function inherently exists only when there is enough energy in the battery, and that the life of the battery, moreover, is directly connected to the depth of discharge and the number of usable cycles, the present invention proposes a solution for controlling the hybrid drive system based solely on controlling the battery charge level, and more particularly, it aims to optimize control of the discharge depth and the number of charge and discharge cycles of the battery, in order to minimize wear of the battery, which is heavily used in this type of operation.

Such a control strategy must be capable of periodically determining in which drive mode the vehicle should be, deciding whether to require a battery recharge by the heat engine, and whether to authorize or prohibit the use of regenerative braking.

To this end, the object of the present invention is a method of controlling a hybrid drive system of a vehicle, in particular a motor vehicle, of the type that comprises various members, including a heat engine and at least one electric drive machine adapted to operate as a motor or as a generator and enabling combustion and/or electric drive modes, a braking system adapted to implement regenerative and/or dissipative braking, and a battery with a set nominal electric power, characterized in that it comprises the following steps:

- a first step of obtaining the acceleration request of the driver in order to determine the corresponding power at the wheel, obtaining the state-of-charge level of the battery, which is between a minimum allowed threshold and a maximum allowed threshold for a given drive mode, and obtaining the available braking power, which makes it possible to decide between electric and dissipative braking;
- a second step of controlling the state of charge, which uses a battery recharge requirement status indicator, a first minimum state of charge of the battery, a second minimum state of charge of the battery, greater than the first, and the power at the wheel requested by the driver to decide between either requiring a battery recharge or setting input parameters for choosing the drive mode; and
- a third step of choosing the drive mode, which uses the battery power actually available, the drive power at the wheel requested by the driver, and the maximum power available from the heat engine to select the most appropriate drive mode for the vehicle operating situation.

According to a characteristic, the control step necessarily triggers the battery to recharge when the state of charge of the battery is less than the first set minimum threshold and when the power requested at the wheel by the driver is zero.

According to another characteristic, when the power requested at the wheel is greater than the maximum power available from the heat engine, the available battery power is calculated by multiplying the nominal battery power by a first battery charge coefficient whose value varies between 0 and 1 according to a preestablished law, between the first set minimum threshold of the battery state of charge, which is greater than the allowed minimum threshold, and a first set maximum threshold of the battery state of charge, which is less than the allowed maximum threshold.

When the power requested at the wheel is less than the maximum power available from the heat engine, the available battery power is calculated by multiplying the nominal battery power by a second battery charge coefficient whose value varies between 0 and 1 according to a preestablished law, between the second set minimum battery state-of-charge threshold, which is greater than the allowed minimum threshold, and a second set maximum threshold, which is less than the allowed maximum threshold.

According to another characteristic, the drive mode selection step chooses pure electric drive mode when the power at the wheel requested by the driver is less than the available battery power and when the battery state of charge is greater than the second set minimum threshold. According to another characteristic, the drive mode selection step chooses combustion drive mode with battery recharge when the power at the wheel requested by the driver is greater than the available battery power and when the battery state of charge is less than the second set minimum threshold, and when the power at the wheel requested by the driver is less than the power available from the heat engine.

According to another characteristic, the drive mode selection step chooses combustion-only drive mode without battery recharge when the power at the wheel requested by the driver is greater than the available battery power and when the battery state of charge is greater than the second set minimum threshold.

According to another characteristic, the drive mode selection step chooses combustion-only drive mode without battery recharge when the power at the wheel requested by the driver is greater than the maximum power available from the heat engine, and when the battery state of charge is less than the first set minimum threshold.

According to another characteristic, the drive mode selection step chooses combustion and electric drive modes without battery recharge when the power at the wheel requested by the driver is greater than the maximum power available from the heat engine, and when the battery state of charge is greater than the first set minimum threshold.

According to another characteristic, the method consists in adding in a threshold correction respectively to the first and second battery state-of-charge thresholds to prevent any oscillation between pure electric drive mode and combustion drive mode with battery recharge.

According to another characteristic, when electric braking is used and reaches the maximum power available through the electric machine, dissipative braking is added as needed.

According to another characteristic, electric braking is prohibited when the battery charge level is greater than the maximum allowed threshold.

According to another characteristic, when the driver is operating neither the brake nor the accelerator, it orders a ramping power generated by the drive system.

A main advantage of the invention is that it requires only a limited number of measuring and calculating operations, thereby reducing the processing capacity needed for energy management in a hybrid drive system, and thus optimizing the control thereof by using said management.

Such a system is not tied to any specific drive system architecture, and can be applied to such drive systems as power split, parallel, series, etc.

Moreover, its implementation is simple, robust, and effective.

It will be supposed that the members of the hybrid drive system—the heat engine, the electric machines, the transmission, and the regenerative braking capability—will be used at their best efficiency points.

BRIEF DESCRIPTION OF THE DRAWINGS

Other characteristics and advantages of the present invention will appear in the description given hereinafter of a non-limiting implementation example, referring to the attached figures, in which.

DETAILED DESCRIPTION OF PARTICULAR EMBODIMENTS

Figure 1:
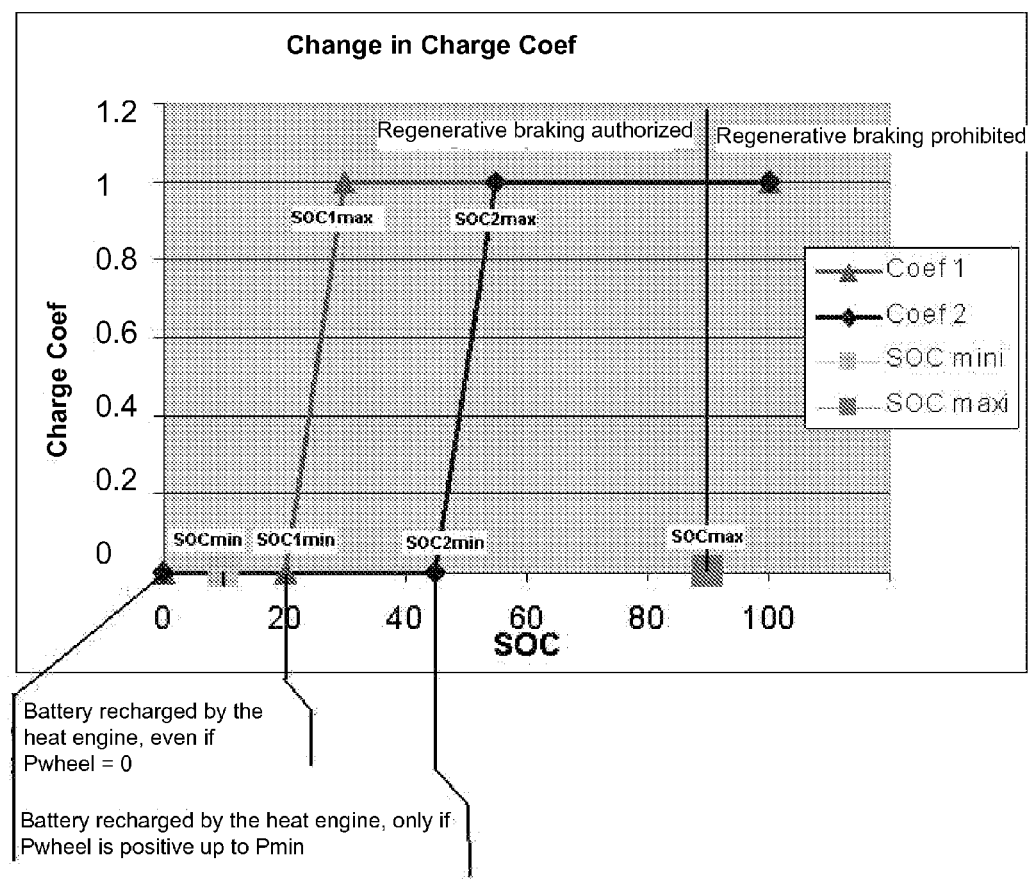
FIG. 1 is a graph showing the change in the two battery charge coefficients used by the method according to the invention as a function of the state-of-charge level of the battery, also known as the SOC of the battery.

FIG. 1 illustrates the battery recharge strategy implemented by the control method according to the invention.

This strategy is primarily based on managing the battery energy via determining two charge coefficients, Coef1 and Coef2 respectively, with values between 0 and 1, and which, multiplied by the nominal battery power bat, will determine the actual power allowed Pbat for implementing pure electric or combined combustion and electric (boost) drive.

For this purpose, the method according to the invention calculates one of the coefficients Coef1 or Coef2 as a function of the power requested at the wheel by the driver Pwheel.

If the power requested at the wheel Pwheel is greater than the maximum power available from the heat engine Pengmax, the method will use the first coefficient Coef1 to obtain the available battery power Pbat, and otherwise, the method will use the second coefficient Coef2.

The graph shown in FIG. 1 gives an example of a linear trend from 0 to 1 in the value of the coefficients Coef1 and Coef2.

The charge coefficients Coef1 and Coef2 vary between minimum and maximum thresholds, which are respectively SOC1min, SOC1max and SOC2min, SOC2max, expressed as a percentage of SOC; these thresholds are within an operating range of the battery, between an allowed minimum state of charge SOCmin and an allowed maximum threshold SOCmax, which is set between 10 and 90% in the example shown on the graph in FIG. 1.

In this example, the first coefficient Coef1 is equal to 0 for SOC<SOC1min (<20% in the example on the graph).

It is >0 or =1 between SOC1min and SOC1max and it is =1 for SOC>SOC1max.

The second coefficient Coef2 is equal to 0 for SOC<SOC2 min (<45% in the example on the graph).

It is > or =1 between SOC2 min and SOC2max and it is =1 for SOC>SOC2max. Regenerative braking is authorized for a SOC between 0 and SOCmax. It is prohibited above that level.

The change in the charge coefficients Coef1 and Coef2 is not necessarily linear, and depends in particular on driving comfort adjustments.

The available battery power Pbat at each iteration of the method will be calculated by multiplying the nominal battery power bat by the coefficient obtained: either Pbat=Coef1·bat or Pbat=Coef2·bat This strategy makes it possible to control the change in the SOC as a function of time and vehicle use type.

Figure 2:
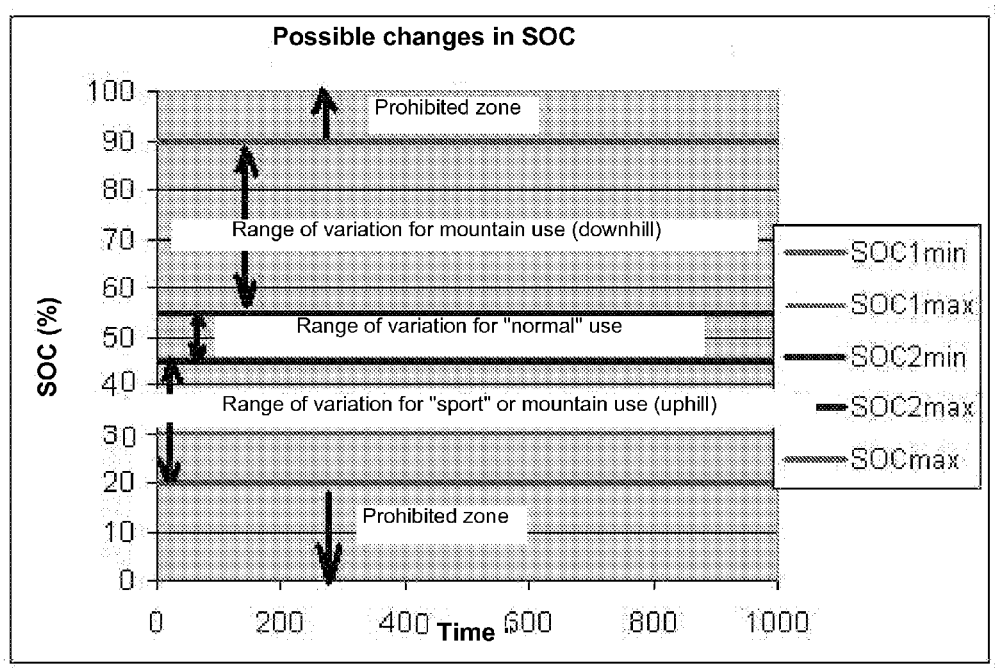
FIG. 2 is a graph showing the operating ranges of the battery with the method according to the invention.

The graph in FIG. 2 illustrates the possible changes over time in the SOC as a function of vehicle use.

The numerical values shown on this graph for the thresholds are given only as an example to help clarify. These values are defined when the strategy is finalized as a function of the battery's capacity to undergo charge and recharge cycles (its "cycling" capacity), driving comfort features, and the performance of the various members of the drive system.

As an example, three ranges of variation are defined for the SOC:
- a range of variation for driving on mountain roads (with steep descents); the term "mountain" is also applied simply to a slight variation in altitude or steep uphill/downhill (a range that can vary between SOCmax=90% and SOC2 min=55%);
- a range of variation for so-called "normal" use; in normal use, the range of variation of the SOC is small (10%, for example, between 45% and 55%), which makes it possible to maximize the battery lifespan, and
- a range of variation for "sport" or mountain (uphill) use; for more unusual uses such as mountain or sport use, the range of use will be increased to provide the requested performance (between SOC2 min=45% and SOC1min=20%).

Two prohibited zones are also defined, for SOC<20% and SOC>90%.

The following table can be drawn up, summarizing the different operating modes of the drive system controlled by the method according to the invention:

| | | | | Drive Mode | | | |
|---|---|---|---|---|---|---|---|
| SOC | Coef1 | Coef2 | Pwheel = 0 | 0 < Pwheel < Pengmax<br>Pbat = coef2 · bat<br>Pwheel < Pbat | 0 < Pwheel < Pengmax<br>Pbat = coef2 · bat<br>Pwheel > Pbat | Pwheel > Pengmax<br>Pbat = coef1 · bat | Regenerative Braking |
| Less than SOC1min | 0 | 0 | Bat recharge | | Combustion + Battery recharge | Combustion | Authorized |
| Between SOC1min and SOC2min | >0 or =1 | 0 | X | Combustion + Battery recharge | Combustion + Battery recharge | Combustion + Electric | Authorized |
| Greater than SOC2min | 1 | >0 or =1 | X | Electric | Combustion | Combustion + Electric | Authorized |
| Greater than SOCmax | 1 | 1 | X | Electric | Combustion | Combustion + Electric | Prohibited |

In this table, one can distinguish the various drive modes allowed (considered as the output parameters of the control strategy according to the invention) according to the battery SOC levels, the drive power at the wheel requested by the driver Pwheel, and the braking power at the wheel requested by the driver Pbrake, which are all input parameters for the control strategy according to the invention.

The different drive modes possible are:
- Electric (pure);
- Combustion (pure);
- Combustion+electric (boost function, with Pbat=Coef1·bat>0);
- Combustion+battery recharge (SOC<SOC2 min and Pwheel>0);
- Battery recharge at standstill; and
- Authorizing or prohibiting the use of regenerative braking Note that recharging the battery with the heat engine is authorized even if the drive power at the wheel Pwheel=0, i.e. for a range of battery use less than SOC1min. To control the different drive modes, the method according to the invention uses a recharge requirement status indicator (or status variable) Pmin, which has the value 0 when a recharge is not necessary, and a value Pengmin equal to a minimum power level needed from the engine if a recharge is required.

With the dynamic behavior of the input parameters, it has been observed that the variation in SOC is a slow process compared to the variation in drive power at the wheel requested by the driver Pwheel. This power Pwheel will thus have to be filtered in order to prevent an oscillation between pure electric drive mode and combustion mode with battery recharge. Conversely, another kind of oscillation can occur when the driver requests a constant level of power. That is, the pure electric drive mode discharges the battery naturally, and an unwanted oscillation can change the electric drive mode to a combustion drive mode with battery recharge sooner than expected, which will once again make the system switch into electric drive mode, producing an unwanted oscillation between the drive modes (with repeated stopping and starting of the heat engine).

To remedy this oscillation problem, the method according to the invention also applies a correction of a few percentage points to the target SOC, which makes it possible to prevent an oscillation between pure electric drive mode and combustion drive mode with battery recharge and when the battery is recharging at a standstill. Advantageously, this makes it possible to create a hysteresis that can eliminate the oscillation.

The implementation of the method according to the invention will now be described below, referring to FIGS. 3 to 6.

Figure 3:
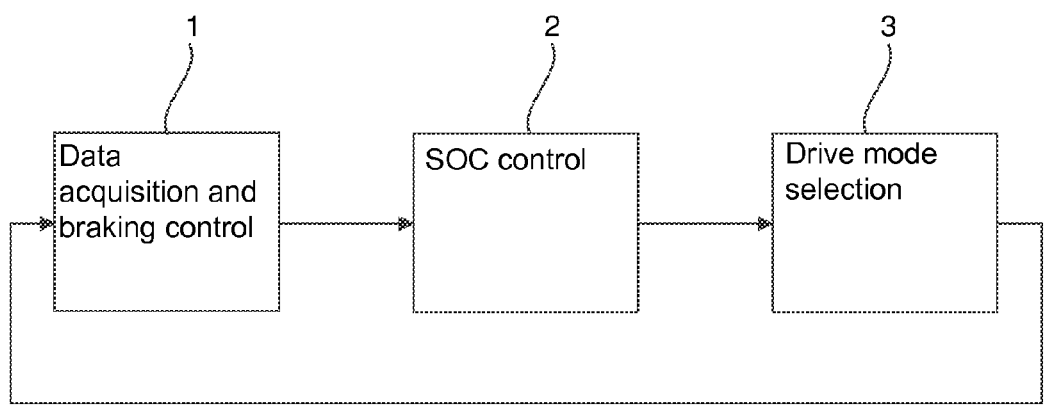
FIG. 3 is a block diagram of the main steps of the control method according to the invention.

FIG. 3 illustrates a block diagram of the main steps of the control method according to the invention:
- step 1 of obtaining the driver request, the battery state of charge, and braking control;
- step 2 of controlling the state of charge (SOC) of the battery; and
- step 3 of selecting the drive mode.

Figure 4:
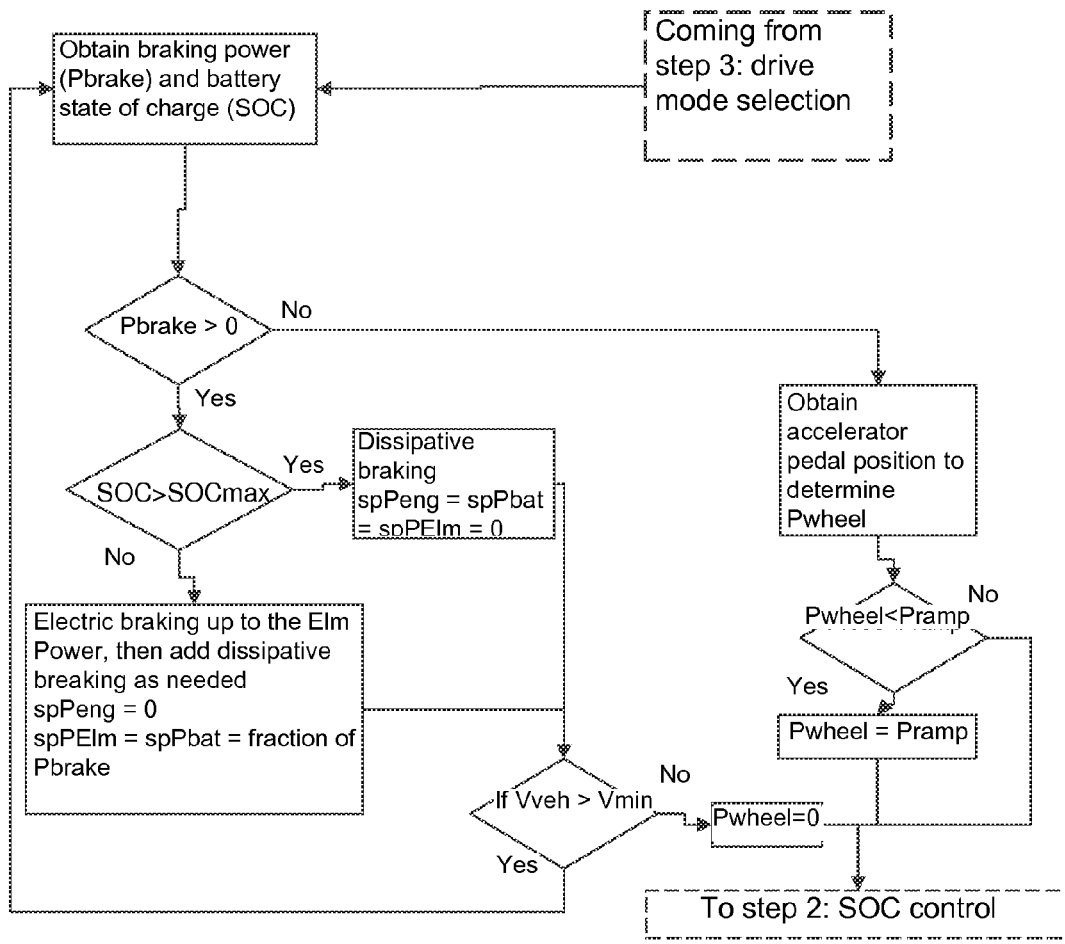
FIG. 4 is a block diagram of a first step of the method according to the invention, of obtaining the driver's request, the state of charge of the battery, and of braking control.

FIG. 4 illustrates the first step 1 of the method according to the invention in greater detail. In this first step 1, the method obtains the battery state of charge SOC at a set instant T, as well as the braking power at the wheel requested by the driver Pbrake.

If no braking request is detected, Pbrake=0, e.g., no action is detected on the brake pedal, then the method obtains the acceleration requested by the driver, e.g., by detecting the accelerator pedal position to determine the power at the wheel Pwheel, also known as the pedal position image; this image will be used as an input parameter for step 2 of controlling the state of the battery SOC.

The power requested at the wheel Pwheel is then compared to what is known as a "ramping" power Pramp, which corresponds to a minimum power requested at the wheel if the driver is touching neither the brake nor the accelerator. Such a ramping function is particularly known in electronically controlled manual gearboxes ECMG in which the friction discs of the controlled clutch remain in contact even with no action by the driver on the brake or accelerator pedal. The term "bite" is also used to define this operating state of the clutch. The same phenomenon exists in drive systems with automatic gearboxes (AGB), where the hydraulic coupling continues to apply torque to the wheel with no action on the accelerator. If the power requested at the wheel Pwheel<Pramp, then the power requested at the wheel is matched to the ramping power Pramp, and this value Pwheel=Pramp is the one transmitted to the SOC control step 2. Otherwise, the current value Pwheel is the one transmitted to the SOC control step 2.

If a braking request is detected, Pbrake>0, e.g., an action on the brake pedal is detected, then the method verifies whether the SOC obtained previously is greater than a set SOCmax, SOC>SOXmax.

Figure 5:
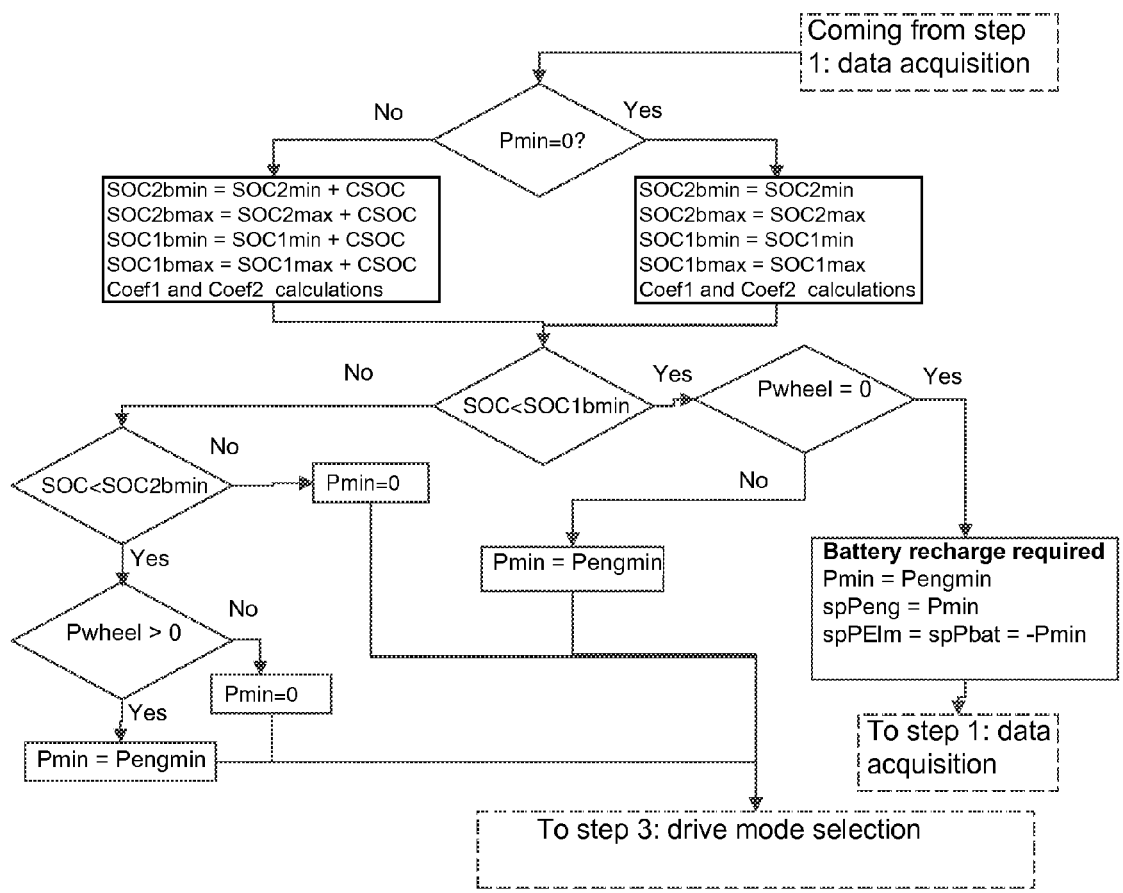
FIG. 5 is a block diagram of a second step of the method according to the invention, of controlling the state of charge (SOC) of the battery.

If SOC>SOXmax, then the method orders purely dissipative braking and sets the power setpoints for the electric machine spElm, for the heat engine spPeng, and the battery spPbat to 0, and then verifies whether the vehicle speed Vveh is greater than or less than a set threshold Vmin (e.g., 5 kph). Vmin corresponds to a minimum speed threshold below which the method authorizes the battery to recharge if the SOC is less than a set SOC.
  If Vveh>Vmin, then the method reiterates obtaining Pbrake and the SOC at a new set instant T.
  If Vveh<Vmin, and a braking power is requested, the power to the wheel is then set at zero, and this value Pwheel=0 is the one transmitted to the SOC control step 2.
Otherwise, SOC<or =SOCmax, so it orders electric braking up to the power deliverable by the electric machine Elm, adding dissipative braking if necessary. At the same time, it sets the power setpoint for the heat engine spPeng to 0 and the power setpoints for the electric machine spPElm and the battery spPbat to a fraction of the requested braking power Pbrake, and then verifies whether the vehicle speed Vveh is greater than or less than a set threshold Vmin (e.g., 5 kph). Vmin corresponds to a minimum speed threshold below which the method authorizes the battery to recharge if the SOC is less than a set SOC.
  If Vveh>Vmin, then the method reiterates obtaining Pbrake and the SOC at a new set instant T.
  If Vvéh<Vmin, and a braking power is requested, the power to the wheel is then set at zero, and this value Pwheel=0 is the one transmitted to the SOC control step 2. FIG. 5 illustrates the second step 2 of the method according to the invention in greater detail.

In this second step 2, the method controls the battery state of charge SOC as a function of the parameter value established during the acquisition step 1.

The accelerator position image Pwheel, which is a system input parameter, and the SOC level are what will determine the value of the status variable Pmin, which can take either of two values: 0 (battery recharge not required) or Pengmin (minimum power level requested from the heat engine if battery recharge by the heat engine is required). If Pmin=0 (no recharge required), then there is no correction to the thresholds, and the thresholds are initialized as follows:
SOC2bmin=SOC2 min
SOC2bmax=SOC2max
SOC1bmin=SOC1min
SOC1bmax=SOC1max
and then the method calculates the charge coefficients Coef1 and Coef2.

If Pmin is different from 0 (and therefore equal to Pengmin),
then the method sets SOC thresholds with a correction CSOC corresponding to a few percentage points of the SOC, relative to the nominal thresholds SOC1min, SOC1max, SOC2 min and SOC2max:
SOC2bmin=SOC2min+CSOC
SOC2bmax=SOC2max+CSOC
SOC1bmin=SOC1min+CSOC
SOC1bmax=SOC1max+CSOC
and then the method calculates the charge coefficients Coef1 and Coef2 corresponding to these new thresholds.

Next, the method determines whether the SOC is less than the minimum threshold of the first charge coefficient Coef1 with the correction SOC1bmin (SOC<SOC1bmin) and
  If SOC<SOC1bmin, then it determines whether Pwheel=0 and Vveh<Vmin, and
    If Pwheel=0 and Vveh<Vmin, then it requires the battery to recharge, sets the value of Pmin at Pengmin, sets the heat engine power setpoint spPeng to the value of Pmin, and sets the power setpoints for the electric machine spPElm and battery spPbat at −Pmin. These variables with these values are the ones that are then taken into account by the first step 1, acquisition.
    If Pwheel=0 and Vveh<Vmin is not verified, then Pmin takes the value Pengmin, which value will then be taken into account by the drive mode selection step 3.
  If SOC<SOC1bmin is not verified, then it determines whether SOC<SOC2bmin, and
    if SOC<SOC2bmin, then it determines whether Pwheel>0, and
      if Pwheel>0, then Pmin takes the value Pengmin, which value will then be taken into account by the drive mode selection step 3.
      If Pwheel>0 is not verified, then Pmin takes the value 0, which value will then be taken into account by the drive mode selection step 3.
    If SOC<SOC2bmin is not verified, then Pmin takes the value 0, which value will then be taken into account by the drive mode selection step 3.

Figure 6:
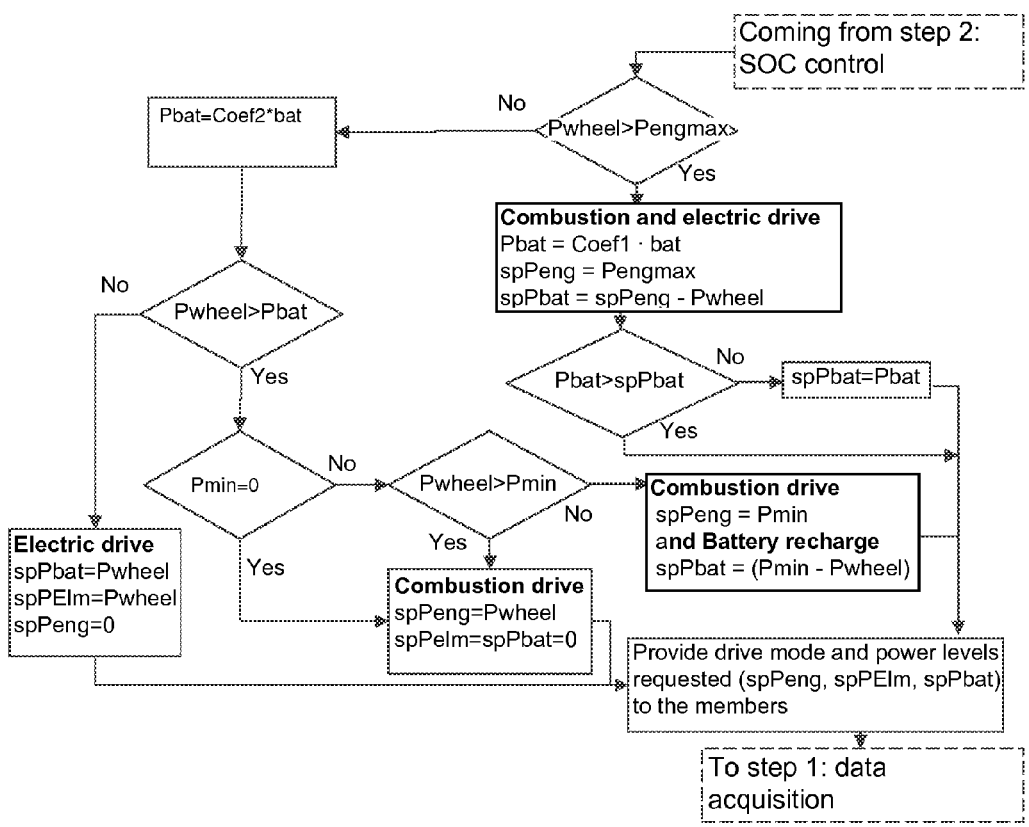
FIG. 6 is a block diagram of a third step of the method according to the invention, of selecting the drive mode.

FIG. 6 illustrates the third step 3 of the method according to the invention in greater detail. In this third step, the method selects the most appropriate drive mode for the situation.

In this step, the method determines whether Pwheel>Pengmax (Pengmax corresponds to the maximum power available through the heat engine).

If Pwheel>Pengmax, then combustion and electric drive mode is the one selected; the value of the variable Pbat, which corresponds to the available battery power, is obtained by multiplying the maximum (nominal) battery power bat by the first state-of-charge coefficient Coef1; the heat engine power setpoint spPeng is set at Pengmax and the battery power setpoint spPbat is set at spPeng−Pwheel, and
  If Pbat>spPbat, then the method provides the selected drive mode and the power levels requested to the members of the drive system via the setpoints spPeng, spPElm, spPbat. This information re-initializes the acquisition step 1.
  If Pbat>spPbat is not verified, then spPbat=Pbat and the method provides the selected drive mode and the power levels requested to the members of the drive system via the setpoints spPeng, spPElm, spPbat.
This information re-initializes the variables of the acquisition step 1.

If Pwheel>Pengmax is not verified, then Pbat is calculated by multiplying the maximum (nominal) battery power bat by the second state-of-charge coefficient Coef2, and
  If Pwheel>Pbat is verified, and
    if Pmin=0 is verified, then combustion drive mode is the one selected by setting spPeng=Pwheel and spPElm=spPbat=0; the method then provides the selected drive mode and the power levels requested to the members of the drive system via the setpoints spPeng, spPElm, spPbat.

This information re-initializes the acquisition step 1.

If Pmin=0 is not verified, and

If Pwheel>Pmin is verified, then combustion drive mode is the one selected by setting spPeng=Pwheel and spPElm=spPbat=0; the method then provides the selected drive mode and the power levels requested to the members of the drive system via the setpoints spPeng, spPElm, spPbat.

This information re-initializes the acquisition step 1.

If Pwheel>Pmin is not verified, then combustion drive mode is the one selected by setting spPeng=Pmin and requiring the battery to recharge, and by setting spPbat=(Pmin−Pwheel); the method then provides the selected drive mode and the power levels requested to the members of the drive system via the setpoints spPeng, spPElm, spPbat.

This information re-initializes the acquisition step 1.

If Pwheel>Pbat is not verified, then electric drive mode is the one selected, by setting spPbat=Pwheel, spPElm=Pwheel, and spPeng=0; the method then provides the selected drive mode and the power levels requested to the members of the drive system via the setpoints spPeng, spPElm, spPbat.

This information re-initializes the acquisition step 1.

In the example used as an aid to the description given above, two charge coefficients were taken into consideration, with four independent SOC thresholds: SOC1min, SOC1max, SOC2min, and SOC2max.

Without departing from the scope of the present invention, one can certainly envision having four SOC thresholds that are interdependent, and that action on one of the four threshold triggers a controlled change in the other three. This dependence is quite an advantage, in particular for linking energy management to altitude variations when coupled with a GPS or other type of satellite navigation system.

For example, one can set SOC2 min with intervals:
SOC2max=SOC1min+10, SOC1min=SOC2min −25, SOC1max=SOC2min −15.

Lastly, as a reminder, the control method according to the invention is not tied to any specific drive system architecture.

This obviously entails an adaptation device or interface between the method according to the invention and the drive system being used.

This interface will have to be capable of accepting or not accepting the control process proposed by the control method according to the invention, which offers an optimal control strategy based solely on the state of charge of the battery, with no consideration of performance or of the availability (operating state) of one or more members that make up the drive system.

Glossary of variables and parameters used in the description and figures:

Variables:
bat=Maximum battery power
SOC=Battery state of charge
SOCmin=Minimum allowed SOC
SOCmax=Maximum allowed SOC
Coef1=Coefficient between 0 and 1 depending on the state of charge in the operating situation where the power requested at the wheel Pwheel is greater than the maximum power of the heat engine alone Pengmax
SOC1min=SOC with Coef1=0
SOC1max=SOC with Coef1=1
Coef1=Coefficient between 0 and 1 depending on the state of charge in the operating situation where the power requested at the wheel Pwheel is less than the maximum power of the heat engine alone
SOC2min=SOC with Coef1=0
SOC2max=SOC with Coef1=1
CSOC=Correction by a few percentage points of the target SOC, which makes it possible to prevent an oscillation between pure electric drive mode and combustion drive mode+recharge and while the battery is recharging at a standstill
SOC1$b$min=SOC1min when Pmin=O and SOC1max+CSOC when Pmin=Pengmin
SOC1$b$max=SOC1max when Pmin=0 and SOC1max+CSOC when Pmin=Pengmin
SOC2$b$min=SOC2min when Pmin=0 and SOC2min+CSOC when Pmin=Pengmin
SOC2$b$max=SOC2max when Pmin=0 and SOC2max+CSOC when Pmin=Pengmin
Pbat=Available battery power at each computing step. Obtained by multiplying bat by Coef1 or Coef2
Pwheel=Power at the wheel requested by the driver (pedal position image)
Pbrake=Braking power requested through action on the brake pedal
Pmin=Variable of status, equal to 0 or Pengmin (recharge requirement status indicator)
Pengmin=Minimum power level requested from the engine if a recharge by the engine is required
Pengmax=Maximum heat engine power
spPElm=Electric machine Elm power setpoint
spPeng=heat engine power setpoint
spPbat=Battery power setpoint
Vmin=Minimum speed corresponding to a threshold below which battery recharge is authorized if the SOC is less than SOC1min
Pramp=Ramping power corresponding to a minimum power requested at the wheel if the driver is touching neither the brake nor the accelerator Control Strategy Input Parameters:
Battery SOC level
Drive power at the wheel requested by the driver Pwheel
Braking power at the wheel requested by the driver Pbrake Output Parameters:
Drive mode selection:
  Pure electric
  Pure combustion
  Combustion+electric (boost function) (Pbat positive)
  Combustion+battery recharge (Pbat negative)
  Battery recharge at vehicle standstill
  Regenerative braking allowed or prohibited Adjustment Parameters:
Extreme battery SOC levels: SOC min and max
SOC levels in normal or boost operation: SOC1min, SOC1max, SOC2min, SOC2max
Value of CSOC that makes it possible to regulate a risk of oscillation between drive modes
Pengmin=Minimum power level requested from the engine when a recharge is required by the heat engine

The invention claimed is:

1. Control method for a hybrid drive system of a vehicle, in particular a motor vehicle, the hybrid drive system including (i) a heat engine, (ii) at least one electric drive machine adapted to operate as a motor or as a generator and enabling combustion and/or electric drive modes, (iii) a braking system adapted to implement regenerative and/or dissipative braking, and (iv) a battery with a set nominal electric power (bat), which method comprises the following steps:

a first step of obtaining an acceleration request of the driver in order to determine a corresponding power at the wheel (Pwheel), obtaining a state-of-charge level of the battery (SOC), and obtaining a braking power at the wheel requested by the driver (Pbrake), which makes it possible to decide whether it is appropriate to apply electric or dissipative braking;

a second step of controlling the state of charge (SOC) of the battery, comprising, as a function of a battery recharge requirement status indicator (Pmin), when the power requested at the wheel (Pwheel) is greater than a maximum power available from the heat engine (Pengmax), calculating an available battery power (Pbat) by multiplying a nominal battery power (bat) by a first battery charge coefficient (Coef1) whose value varies between 0 and 1 according to a first preestablished law, between a first set minimum threshold (SOC1min) of the battery state of charge, which is greater than an allowed minimum threshold (SOCmin), and a first set maximum threshold (SOC1max), which is less than an allowed maximum threshold (SOCmax), and when the power requested at the wheel (Pwheel) is less than the maximum power available from the heat engine (Pengmax), calculating the available battery power (Pbat) by multiplying the nominal battery power (bat) by a second battery charge coefficient (Coef2) whose value varies between 0 and 1 according to a second preestablished law, between a second set minimum battery state-of-charge threshold (SOC2min), which is greater than the allowed minimum threshold (SOCmin), and a second set maximum threshold (SOC2max), which is less than the allowed maximum threshold (SOCmax); and a third step of choosing the drive mode, as a function of the available battery power (Pbat), the drive power at the wheel requested by the driver (Pwheel), and the maximum power available from the heat engine (Pengmax), by setting a most appropriate drive mode of the hybrid drive system for the vehicle operating situation, which is selected among a set of available drive modes of the hybrid drive system including:

pure electric;
combustion-only;
combustion and electric;
combustion and battery recharge;
battery recharge at standstill; and
use of regenerative braking authorized or prohibited.

2. Method according to claim 1, wherein the drive mode selection step comprises choosing pure electric drive mode when the power at the wheel requested by the driver (Pwheel) is less than the available battery power (Pbat) and when the battery state of charge (SOC) is greater than the second set minimum threshold (SOC2min).

3. Method according to claim 1, wherein the drive mode selection step comprises choosing combustion drive mode with battery recharge when the power at the wheel requested by the driver (Pwheel) is greater than the available battery power (Pbat) and when the battery state of charge (SOC) is less than the second set minimum threshold (SOC2min), and when the power at the wheel requested by the driver (Pwheel) is less than the power available from the heat engine (Pengmin).

4. Method according to claim 1, wherein the drive mode selection step comprises choosing combustion-only drive mode without battery recharge when the power at the wheel requested by the driver (Pwheel) is greater than the available battery power (Pbat) and when the battery state of charge (SOC) is greater than the second set minimum threshold (SOC2min).

5. Method according to claim 1, wherein the drive mode selection step comprises choosing combustion-only drive mode without battery recharge when the power at the wheel requested by the driver (Pwheel) is greater than the maximum power available from the heat engine (Pengmax), and when the battery state of charge (SOC) is less than the first set minimum threshold (SOC1min).

6. Method according to claim 1, wherein the drive mode selection step comprises choosing combustion and electric drive modes without battery recharge when the power at the wheel requested by the driver (Pwheel) is greater than the maximum power available from the heat engine (Pengmax), and when the battery state of charge (SOC) is greater than the first set minimum threshold (SOC1min).

7. Method according to claim 1, comprising, when electric braking is used and reaches the maximum power available through the electric machine, adding dissipative braking as needed.

8. Method according to claim 1, wherein electric braking is prohibited when the battery charge level (SOC) is greater than the second set maximum threshold (SOC2max).

9. Method according to claim 1, comprising, when the driver is operating neither the brake nor the accelerator, ordering a minimum power called ramping power (Pramp) generated by the hybrid drive system.

10. Method according to claim 1, wherein the control step comprises necessarily triggering the battery to recharge when the battery state of charge (SOC) is less than the first set minimum threshold (SOC1min) and when the power requested at the wheel by the driver (Pwheel) is zero.

11. Method according to claim 1, comprising adding in a threshold correction (CSOC) respectively to the first and second battery state-of-charge thresholds (SOC1min, SOC1max and SOC2min, SOC2max) when the battery recharge requirement status indicator (Pmin) is equal to the minimum power level needed from the heat engine if battery recharge by the heat engine is required (Pengmin), to prevent any oscillation between pure electric drive mode and combustion drive mode.

* * * * *